United States Patent [19]

Gamo et al.

[11] Patent Number: 4,546,227
[45] Date of Patent: Oct. 8, 1985

[54] METHOD OF REDUCING WIRE-CUT ELECTRIC DISCHARGE MACHINING ERRORS

[75] Inventors: Gotaro Gamo; Mitsuo Kinoshita, both of Hachioji; Haruki Obara, Sagamihara, all of Japan

[73] Assignee: Fanuc Ltd., Tokyo, Japan

[21] Appl. No.: 413,381

[22] PCT Filed: Nov. 18, 1981

[86] PCT No.: PCT/JP81/00344
§ 371 Date: Aug. 25, 1982
§ 102(e) Date: Aug. 25, 1982

[87] PCT Pub. No.: WO82/02164
PCT Pub. Date: Jul. 8, 1982

[30] Foreign Application Priority Data

Dec. 29, 1980 [JP] Japan .................. 55-185431

[51] Int. Cl.$^4$ .............. B23P 1/08; B23P 1/12
[52] U.S. Cl. .................. 219/69 W; 219/69 M
[58] Field of Search .......... 219/69 W, 69 M, 69 R, 219/69 S

[56] References Cited

U.S. PATENT DOCUMENTS 4,081,652 3/1978 Janicke et al. .............. 219/69 W
4,232,208 11/1980 Buhler ........................ 219/69 W

FOREIGN PATENT DOCUMENTS 0031512 3/1980 Japan ................... 219/69 W
55-106732 8/1980 Japan ........................ 69 W/

Primary Examiner—M. H. Paschall
Attorney, Agent, or Firm—Staas & Halsey

[57] ABSTRACT

A method of controlling a wire-cut electric discharge machine to prevent cutting errors when cutting a corner CN which are caused by flexing of a wire electrode 1 during electric discharge cutting of a workpiece. Electric discharge is stopped when a rectilinear slot is cut to measure an amount of flexing of the wire electrode 1, and then the measured amount of flexing is used to effect an arithmetic operation to calculate a commanded speed or an interval of time in which relative movement between the wire electrode and the workpiece is arrested at the corner CN. The corner CN is cut under the control of the calculated commanded speed or interval of time in which the relative movement is arrested.

3 Claims, 10 Drawing Figures

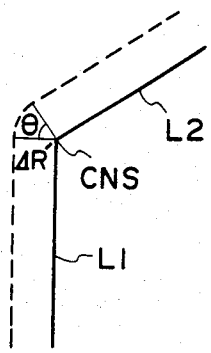
Fig. 7
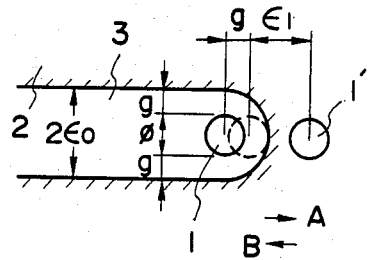
Fig. 8
Fig. 9
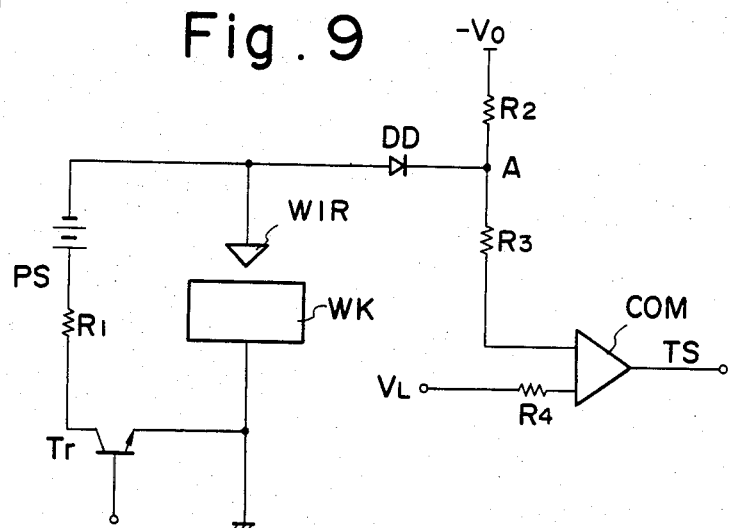
Fig. 10
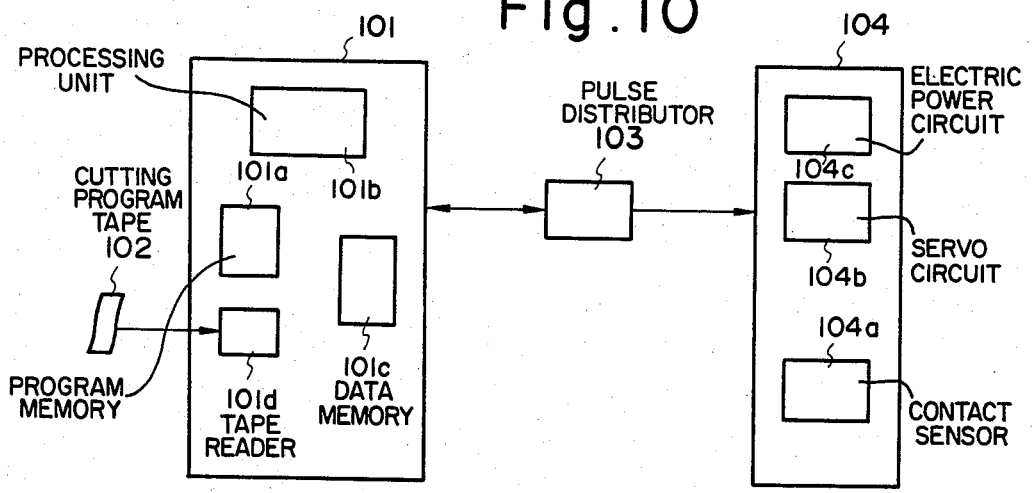

METHOD OF REDUCING WIRE-CUT ELECTRIC DISCHARGE MACHINING ERRORS

DESCRIPTION

BACKGROUND OF THE INVENTION

The present invention relates to a method of controlling a wire-cut electric discharge machine to prevent cutting errors caused by flexing of the wire electrode when a corner is cut during electric discharge cutting operation, and more particularly to a simple method of controlling a wire-cut electric discharge machine to cut a corner.

Wire-cut electric discharge machines operate on the principle that a voltage is applied across a gap between a wire electrode and a workpiece to generate a spark discharge across the gap for cutting the workpiece with the spark energy. The workpiece can be cut to a desired contour by moving the workpiece with respect to the wire electrode based on cutting command data.

In FIG. 1 which shows a known wire-cut electric discharge machine, a wire 1 is reeled out of a reel $RL_1$, extends between a lower guide 4 and an upper guide 4, and is wound around a reel $RL_2$. A voltage is applied by a contact electrode (not shown) to the wire to generate a discharge between the wire 1 and the workpiece 2 for cutting the workpiece 2. The workpiece 2 is fastened to an X - Y table TB movable by motors MX, MY in directions X, Y, respectively. Thus, the workpiece 2 can be cut to a desired configuration by moving the X - Y table TB in the directions X, Y. The upper guide 4 is attached to a moving mechanism movable by motors MU, MV in the directions X, Y, respectively so that the upper guide 4 is movable in the directions X, Y.

The moving mechanism, the reels $RL_1$, $RL_2$, and the lower guide 4 are mounted on a column CM.

A numerical control unit NC serves to read the contents of a command tape TP, and has a distributor circuit 103 for distributing commands for respective axes and drive circuits SVX, SVY, SVU, SVV for the corresponding axes for energizing the motors MX, MY, MU, MV respectively for the axes to move the table TB and the moving mechanism until the workpiece 2 is cut to a desired shape.

FIG. 2 is illustrative of a cutting operation of such an electric discharge cutting machine. When the wire electrode 1 moves in and along a slot 3 in a given direction while cutting the workpiece 2 with electric discharge, a pressure is developed between the wire electrode 1 and the workpiece due to the electric discharge to push back the wire electrode 1 in the direction of the arrow which is opposite to the direction in which the electrode 1 moves, as shown in the cross-sectional view of FIG. 3. The wire electrode 1 is therefore backed off or flexes from the position of the wire guides 4, 4. The cutting accuracy is not affected to an appreciable extent by the amount of such flexing as long as the wire electrode 1 cuts the workpiece 2 along a rectilinear slot. However, the amount of flexing causes a serious problem when the wire electrode 1 cuts the workpiece to form a corner. Thus, as shown in FIG. 4 which is a plan view of a cut slot, a slot 3 is composed of a first rectilinear slot L1 and a second rectilinear slot L2 extending perpendicularly to the first rectilinear slot L1, and defining such a combined slot 3 requires a corner CN to be cut at the junction between the first and second rectilinear slots L1, L2. To this end, the workpiece 2 and the wire electrode 1 are caused to move relatively in one direction to form the first rectilinear slot L1, and thereafter the direction of such relative movement needs to be changed through a right angle under a cutting command to form the second rectilinear slot L2. The wire electrode 1 however has a tendency to be dragged inwardly of the corner CN due to the flexing of the wire electrode 1 at a position in which the electric discharge takes place, with the result that the contour of the slot 3 as it is cut is distorted considerably inwardly and becomes blunt as shown by the dotted lines, a configuration which is different from a commanded shape (shown by the solid lines).

FIG. 5 is a plan view of an arcuate corner CN' to be formed between first and second rectilinear slots L1, L2. In cutting such an arcuate corner CN', the flexing of the wire electrode 1 due to the electric discharge causes the corner CN' to be cut along a path shown by the dotted lines which is duller than a commanded shape as illustrated by the solid lines.

It is known that the cutting errors at such arcuate and angular corners can be reduced by changing the path of cutting, the cutting power supply, the speed of feed, and other factors. However, there are a great many combinations of such cutting conditions, and the customary practice has been complex and impractical so no specific standard is established for controlling the cutting path, the feeding speed, and the cutting power supply voltage.

SUMMARY OF THE INVENTION

Accordingly, it is an object of the present invention to provide a simple method of controlling a wire-cut electric discharge machine to improve blunt corner shapes.

Another object of the present invention is to provide a method of controlling a wire-cut electric discharge machine for improving blunt corner shapes and cutting corners simply by changing the feeding speed.

With a control method according to the present invention, the amount of flexing of a wire electrode due to electric discharge is detected upon electric discharge cutting of a workpiece, at least one of a command speed or a time interval in which relative movement between the wire electrode and the workpiece is arrested is derived as a condition for electric discharge cutting of a corner through an arithmetic operation from the detected amount of flexing, and the relative movement is controlled under the calculated condition for effecting electric discharge cutting the corner. More specifically, the control method of the invention is based on the fact that a cutting error at the corner is caused by the flexing of the wire electrode. The amount of flexing of the wire electrode is detected to control one of the electric discharge cutting conditions such as the speed of relative movement between the wire electrode and the workpiece or the time interval in which such movement is arrested, so that no cutting error will be produced at the corner.

BRIEF DESCRIPTION OF THE DRAWINGS

FIG. 7 is a diagram of a control method of the present invention for correcting the contour of an angular corner;

FIG. 8 is a diagram illustrative of a method of measuring a flexing of a wire electrode, the method being utilized in the present invention;

FIG. 9 is a circuit diagram of a contact sensor device employed in the present invention; and FIG. 10 is a block diagram of an arrangement for carrying out a control method according to the present invention.

BRIEF DESCRIPTION OF THE PREFERRED EMBODIMENTS

Embodiments of the present invention will now be described with reference to the drawings.

Figure 6:
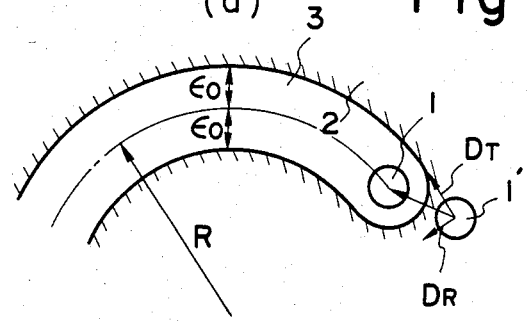
FIG. 6 is a diagram of a control method of the present invention for correcting the contour of an arcuate corner.
Figure 6:
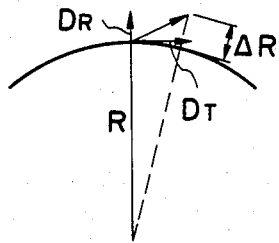

FIG. 6 is illustrative of a control method according to the present invention for forming an arcuate slot.

A wire electrode is designated in its cross section by the reference numerals 1 and 1'. The wire electrode 1 is positioned due to flexing generated by electric discharge, and the wire electrode 1' is located as being guided by wire guides. An arcuate slot 3 is cut in a workpiece 2 by electric discharge generated by the wire electrode 1 which is subjected to flexing. The slot 3 has a width of $2\epsilon_0$ and a central line with a radius of curvature R.

Let the amount of flexing of the wire electrode be $D_0$ while cutting a rectilinear slot. Then, as shown in FIG. 6(a) the amount of flexing $D_T$ along a line tangential to the arcuate slot and the amount of flexing $D_R$ in a radially inward direction generated when cutting the arcuate slot 3 can be expressed respectively by the following equations:

$$D_T = D_0 \quad (1)$$

$$D_R = \frac{4}{3\pi} \cdot \frac{\epsilon_0}{R} D_0 \quad (2)$$

The amount of radially inward flexing $D_R$ is produced because of a difference between the amount of cutting at radially inward and outward portions of the slot 3.

An amount of $\Delta R$ by which a commanded radius of curvature is to be corrected in the radially outward direction for forming the arcuate slot having the radius of curvature R can be derived from the equations (1) and (2) as follows:

$$\Delta R = \sqrt{D_T^2 + (R + D_R)^2} - R \quad (3)$$

$$= \sqrt{D_0^2 + \left(R + \frac{4}{3\pi} \cdot \frac{\epsilon_0}{R} D_0\right)^2} - R$$

Where the amount of flexing $D_R$ in the radial direction is small as compared with the radius of curvature R, the corrected radius of curvature R can be approximated by:

$$\Delta R \approx \frac{D_0}{2R}\left[D_0 + \frac{8}{3\pi}\epsilon_0\right] \quad (4)$$

Therefore, the cutting error due to the flexing of the wire electrode can be compensated for by correcting the radius of curvature of the slot. Correction of the coordinate system however results in a need for changing the coordinates of a succeeding second rectilinear slot to be formed, which is a somewhat complex procedure. According to the present invention, the speed of feed is varied to achieve the same result.

More specifically, the width of the slot 3 is increased by reducing the speed of feed. Now, let an amount of increase $\Delta g$ in the width of the slot be expressed by:

$$\Delta g = K_1 \cdot \frac{F_0 - F}{F_0} \approx K_1 \cdot \frac{F_0 - F}{F} \quad (5)$$

where $F_0$ is the normal commanded speed of feed, F is the reduced speed of feed, and $K_1$ is a constant. The above equation is based on the assumption that the amount of increase $\Delta g$ in the slot width is proportional to the rate of reduction of the feeding speed.

If $\Delta R$ in the equation (4) is equal to $\Delta g$ in the equation (5), then, $$\frac{F}{F_0} = 1 / \left\{1 + \frac{1}{K_1} \cdot \frac{D_0}{2R}\left(D_0 + \frac{8}{3\pi} \cdot \epsilon_0\right)\right\} \quad (6)$$

$$= \frac{R}{R + \Delta R'}$$

where $\Delta R' = \frac{D_0}{2K_1}\left(D_0 + \frac{8}{3\pi}\epsilon_0\right)$

Figure 1:
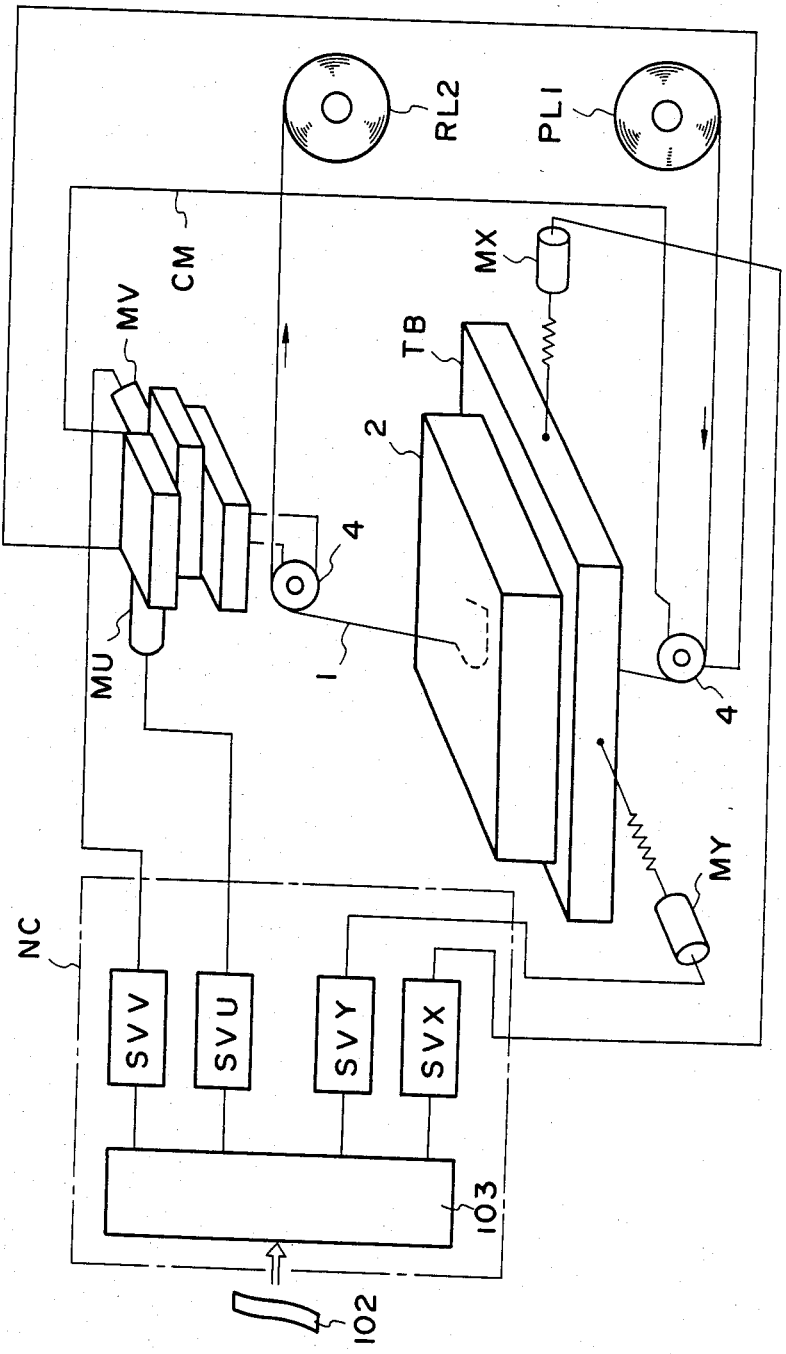
FIGS. 1 and 2 are schematic views of a wire-cut electric discharge machine, to which the present invention is applicable.
Figure 2:
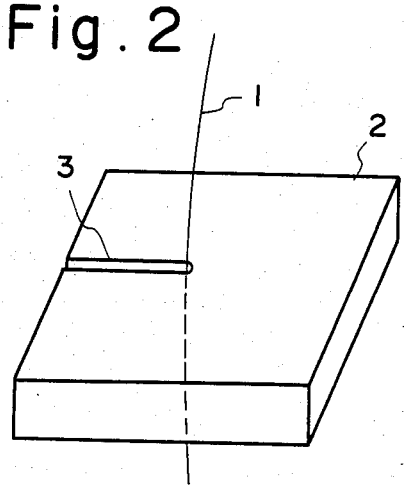
Figure 3:
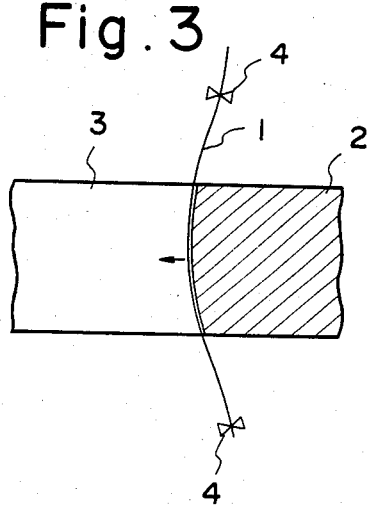
FIG. 3 is a cross-sectional view illustrative of the flexing of a wire electrode.
Figure 4:
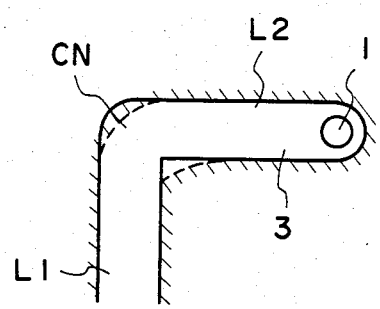
FIGS. 4 and 5 are plan views of cutting errors due to the flexing of the wire electrode which the present invention eliminates.
Figure 5:
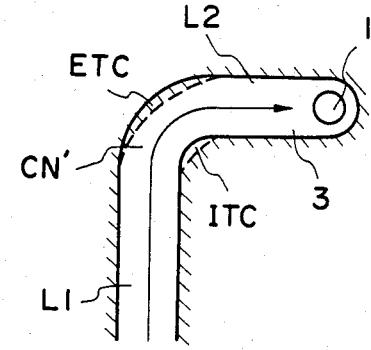

It follows that the shape of the slot can be corrected by cutting the corner having the radius of curvature R with the corrected feeding speed F which can be given by the equation (6). The above correcting process is based on reducing the feeding speed in accordance with the radius of curvature R, the amount of flexing $D_0$, and other parameters to increase the width of the slot and to correct the blunt slot contour. While such a process is effective to improve a concave edge shape ETC (FIG. 5) of the corner, it is fails to improve a convex edge shape ITC (FIG. 5) thereof. However, the convex edge shape can also be improved considerably because the wire electrode moves radially outward with respect to the arcuate slot while cutting the concave edge of the slot.

FIG. 7 is explanatory of a control method according to the present invention effective while forming an angular corner composed of two rectilinear lines $L_1$, $L_2$.

The above equation (6) can be interpreted as meaning that the arc having the commanded radius of curvature R is moved at the speed F, and the arc having the radius of curvature increased by $\Delta R'$ is moved at the commanded speed $F_0$.

In FIG. 7, a corner CNS has a radius of curvature R which is so small that it is substantially nil. When the same reasoning is applied to correction of the shape of the corner shown in FIG. 7 as that for the foregoing arcuate corner, the corner of FIG. 7 can be corrected by cutting the workpiece at the commanded speed $F_0$ along a path spaced outwardly from the corner by the distance $\Delta R'$, which is given in the equation (6) by:

$$\Delta R' = \frac{D_0}{2K_1}\left(D_0 + \frac{8}{3\pi}\epsilon_0\right)$$

Therefore, assuming that the radius of curvature R in the equation (6) is negligibly small, the corrected feeding speed F should be zero.

Stated otherwise, the wire electrode should be held at rest for an interval of time Td in which cutting is arrested. This time interval can be determined by the following equation:

$$Td = \Delta R' \cdot \theta / F_0 \tag{7}$$

where $\theta$ is the angle defined by the corner.

Actual stoppage of the cutting at the corner is equivalent to the condition in which cutting is effected only radially outwardly of the corner with the radius of curvature R being negligibly small. The interval of time Td is then modified by being multiplied by a corrective constant as follows:

$$Td = K_2 \cdot \Delta R' \cdot \theta / F_0 \tag{8}$$

The constants $K_1$, $K_2$ in the equations (6), (8) can experimentally be determined.

As described above, by detecting an amount of flexing of the wire electrode 1, the commanded speed F and the time interval Td for electric discharge cutting of a workpiece to a desired shape can be derived from the detected amount of flexing through arithmetic operations.

Measurement of the amount of flexing of the wire electrode 1 will then be described.

FIG. 8 is illustrative of the manner in which an amount of flexing of the wire electrode 1 is measured.

Designated in FIG. 8 at the reference numerals 1, 1' is a wire electrode shown in cross section. The wire electrode 1 is located in the illustrated position when it is subjected to a maximum amount of flexing, and the wire electrode 1' is positioned as shown by wire guides. The wire electrode forms a slot 3 in a workpiece 2 by electric discharge cutting.

The amount of flexing of the wire electrode can be measured in the following sequence of steps:

While the workpiece is being cut, electric discharge is temporarily stopped at a predetermined point of measurement (FIG. 8). With electric discharge thus stopped, the wire electrode no longer undergoes electric discharge pressure, whereupon the wire electrode 1 is pulled in the direction toward the wire guides (in the direction of the arrow A) until the wire electrode 1 is held against the workpiece 2. When the wire electrode 1 contacts the workpiece 2, a contact sensor device detects such a contact.

FIG. 9 is a circuit diagram of such a contact sensor device comprising a wire electrode WIR, a workpiece WK, a cutting power supply PS, a comparator COM, resistors $R_1$–$R_4$, a transistor Tr for applying a cutting voltage between the wire electrode and the workpiece, and a diode DD. The comparator COM is supplied with a signal having a detection level $V_L$. When the wire electrode WIR and the workpiece WK are not connected to each other, a voltage of $-V_0$ is applied as an input to the comparator COM, which remains de-energized. When the wire electrode WIR is connected to the workpiece WK, the potential at the point A falls to zero, whereupon the comparator COM is energized to produce a contact signal TS indicative of detection of connection between the wire electrode and the workpiece.

The transistor TR, the resistor $R_1$, and the cutting power supply PS jointly constitute a discharge circuit, and the diode DD, the resistors $R_2$, $R_3$, $R_4$, and the comparator COM jointly constitute the contact sensor device.

Turning back to FIG. 8, after the wire electrode 1 has been brought into contact with the workpiece 2, the wire electrode 1 is backed off along the cutting path with respect to the workpiece 2. The wire electrode 1 may be moved back by displacing the table with the workpiece placed thereon in the direction of the arrow A with respect to the wire electrode 1, or moving back the wire guides in the direction of the arrow B with respect to the workpiece 2 where the electric discharge cutting machine has movable wire guides.

Continued withdrawal of the wire electrode causes the latter to be out of contact with the workpiece at a certain position. A distance $\epsilon_1$ which the wire electrode traverses in moving back from the position in which electric discharge is stopped to the position in which the wire electrode starts to disengage from the workpiece is measured, and the measured data is stored in a memory in an NC unit.

Then, a real amount of flexing $D_0$ is calculated according to the following equation to thereby complete the measurement of the amount of flexing:

$$D_0 = g + \epsilon_1 \tag{9}$$

where g is the gap across which electric discharge takes place and can be determined by:

$$g = (2\epsilon_0 - \phi)/2 \tag{10}$$

where $2\epsilon_0$ is the width of the slot and $\phi$ is the diameter of the wire electrode, as shown in FIG. 8. Accordingly, by measuring the width l of the slot and the diameter $\phi$ of the wire electrode and storing their data in advance, the amount of flexing of the wire electrode can be determined through effecting the arithmetic operations of the equations (9), (10). Instead of measuring the parameters $\epsilon_0$, $\phi$ and storing their data in advance, the electric discharge gap g may be measured according to the following process: When the wire electrode 1 is withdrawn out of contact with the workpiece 2 under the foregoing backing-off control, the wire electrode is moved in a direction perpendicular to the direction in which the workpiece is cut (along the cutting path), and a distance to the position in which the wire electrode is in contact with the workpiece is measured. Such a measured distance is utilized as the electric discharge gap g, and the amount of flexing $D_0$ is determined by the equation (9).

Under certain cutting conditions, the wire electrode 1 may not contact the workpiece 2 when electric discharge is stopped at the measuring position, for the reason that the electric discharge gap g between the wire electrode 1 and the workpiece 2 is greater than the amount of flexing of the wire electrode 1. In such an instance, that is, when the contact sensor device does not detect a contact between the wire electrode and the workpiece after electric discharge has been stopped, the wire electrode 1 is moved forward in the cutting direction until it is brought against the workpiece 2, and a distance $\epsilon_1'$ which the wire electrode has moved forward is measured. The amount of flexing $D_0$ can be given by effecting an arithmetic operation represented by the following equation:

$$D_0 = g - \epsilon_1' \tag{11}$$

The foregoing are the details of measurement of an amount of flexing of the wire electrode. The distance $D_0$ as detected that the wire electrode moves back becomes somewhat greater when chips remain in the slot cut in the workpiece which is of an increased thickness, or dependent on the conductivity of a cutting solution used. The true amount of flexing of the wire electrode can be determined by the following equation:

$$D_0 = \epsilon_1 + g - K_3 H \tag{12}$$

where $K_3$ is a constant and H is the thickness of the workpiece.

The amount of flexing can be measured by putting in the program an auxiliary function instruction M20 for such measurement.

FIG. 10 is a block diagram of an arrangement for carrying out the method according to the present invention. An NC unit 101 in the form of a computer comprises a control program memory 101a, a processing unit 101b, a data memory 101c, and a tape reader 101d. The control program memory 101a stores a control program for numerically controlled processing, a program for measuring and processing an amount of flexing of the wire electrode, and a program for correcting the amount of flexing. The arrangement also includes a cutting program tape 102 in which a cutting program is punched, a pulse distributor 103, and an electric discharge cutting machine 104 having a contact sensor device 104a, a servo circuit 104b, and an electric power circuit 104c.

When the auxiliary function instruction M20 is read out of the cutting program tape 102, the NC unit is controlled by the program for measuring and processing an amount of flexing of the wire electrode to enable the processing unit 101b to execute the flexing measuring program stored in the control program memory 101c for measuring the amount of flexing $D_0$ of the wire electrode according to the foregoing sequence. The data memory 101c stores such parameters for determining $D_0$ from the equation (12) as the slot width $\epsilon_0$, the wire electrode diameter $\phi$, the thickness H of the workpiece, and the constant $K_3$.

After the amount of flexing of the wire electrode has been measured, the processing unit 101b executes the flexing correcting program stored in the control program memory 101c to determine the feeding speed F or the time interval Td in which no cutting takes place based on the programmed radius of curvature R, corner angle $\theta$, commanded feeding speed $F_0$ and the amount of flexing $D_0$ through the arithmetic operations represented by the equations (6) and (8), for thereby correcting any blunt corner shape.

An actual cutting operation performed according to the present invention resulted in a cutting error of a few microns or below along an outer edge (concave edge) of an arcuate corner and a blunt shape reduced by 70-80% along an inner convex edge of the corner, so that the cutting accuracy could be increased.

The present invention is highly advantageous in that a blunt shape of a corner can be improved by a simple method.

What is claimed is:

1. A method of controlling a wire-cut electric discharge machine to produce electric discharge between a cutting wire and a workpiece while they are relatively moving at a commanded speed for electric discharge cutting of the workpiece into a commanded shape, comprising the steps of:

detecting an amount of flexing of said wire electrode while the workpiece undergoes electric discharge cutting;

calculating from the detected amount of flexing a calculated cutting condition including at least one of the commanded speed and an interval of time in which relative movement between the wire electrode and the workpiece is arrested as a condition for electric discharge cutting or a corner; and controlling said relative movement under the calculated cutting condition while the corner is being cut.

2. A method according to claim 1, wherein said calculating step includes an arithmetic operation using said amount of flexing, an indicated radius of curvature of an arc, a width of a slot cut, and in indicated commanded speed for determining said commanded speed at an arcuate corner having the indicated radius of curvature.

3. A method according to claim 1, wherein said calculating step includes an arithmetic operation using said amount of flexing, a width of a slot cut, a corner angle, and a commanded speed for determining an interval of time in which the relative movement is arrested at an indicated angular corner.

* * * * *

UNITED STATES PATENT AND TRADEMARK OFFICE
CERTIFICATE OF CORRECTION

PATENT NO. : 4,546,227

DATED : October 8, 1985

INVENTOR(S) : GAMO ET AL.

It is certified that error appears in the above-identified patent and that said Letters Patent is hereby corrected as shown below:

```
Column 1, line 13, after "to" insert --accurately--.
Column 3, line 29, delete "located as being";
          line 30, change "guided" to --positioned--.
Column 6, line 43, "1" should be --ℓ--.
Column 8, line 43, "in" should be --an--.
```

Signed and Sealed this

Eighteenth Day of March 1986

[SEAL]

Attest:

DONALD J. QUIGG

Attesting Officer

Commissioner of Patents and Trademarks